2,709,165
ANTIDIAZOTATES

Wilhelm Seidenfaden, Ernst Fischer, and Hans Thomae, Offenbach (Main), Germany, assignors to Farbwerke Hoechst A. G. vormals Meister Lucius und Bruning, Frankfurt am Main Hochst, Germany, a German company No Drawing. Application December 16, 1952, Serial No. 326,338

Claims priority, application Germany December 22, 1951

7 Claims. (Cl. 260—141)

The present invention relates to new antidiazotates and to a process of preparing the same; more particularly it relates to compounds corresponding to the following general formula

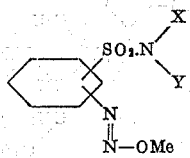

wherein Me represents an alkali metal, X represents an alkyl or cycloalkyl group and Y represents hydrogen, an alkyl or cycloalkyl group and in which the phenyl radical may be further substituted by alkyl or alkoxy groups or halogen atoms.

According to this invention the antidiazotates can be made by converting the diazo-compounds from amines of the general formula

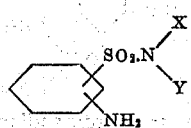

wherein X and Y have the meanings given above, and wherein the phenyl radical may be further substituted by alkyl or alkoxy groups or halogen atoms, into the corresponding antidiazotates by known methods with alkali hydroxides.

According to the kind and position of the substituents in the phenyl radical, the antidiazotates can be made by one of the known methods, for example, by causing the diazo solution to run into a hot concentrated caustic alkali solution, the antidiazotate being immediately formed. It is also possible to prepare first the syndiazotate at a low temperature and to transpose it into the corresponding antidiazotate at a higher temperature. The most suitable method can in each case easily be ascertained by a preliminary test.

It is surprising and could not be foreseen that antidiazotates substituted as indicated above can be obtained in a smooth reaction and that no saponification of the sulfonamide group occurs although it is necessary to conduct the reaction at temperatures between 100° C. and 150° C. with a caustic alkali solution of 20 to 60 per cent. strength.

The following examples serve to illustrate the invention, but they are not intended to limit it thereto, the parts being by weight unless otherwise stated; the parts by weight and the parts by volume are related to each other as are kilograms to liters:

Example 1

200 parts by volume of hydrochloric acid (20° Bé.) are stirred into a hot solution of 258 parts of 1-amino-2-methoxybenzene-5-sulfonic acid-diethylamide in 1500 parts by volume of 2N-hydrochloric acid.

By external cooling the temperature of the suspension so obtained is reduced to about +7° C. and diazotization is carried out by quickly introducing a solution of 72 parts of sodium nitrite in 110 parts by volume of water.

The diazo-solution is run, while well stirring and cooling, at a temperature of 0° C. to +5° C. into a solution of 500 parts of poatssium hydroxide in 2500 parts by volume of water. 4950 parts by volume of a slightly reddish syndiazo-solution are obtained.

Into the syndiazo-solution so obtained there are quickly introduced 1750 parts of potassium hydroxide (alkali concentration about 40 grams per 100 cc. of liquid), whereby the temperature rises to 60° C. The mixture is then heated to 115° C. within 25 minutes and stirred until cold. The precipitate is filtered with suction through an asbestos filter, washed with a caustic potash solution of 10 per cent. strength saturated with potassium chloride and the adhering liquid is removed by pressing.

540 parts of a flesh-colored press cake of potassium antidiazotate from 1-amino-2-methoxybenzene-5-sulfonic acid-diethylamide containing 40.6 per cent. of the pure substance, calculated on the molecular weight 258 of the amine, are obtained which corresponds to 85 per cent. of the theoretical yield.

The same result is obtained by introducing a syndiazo-solution prepared as described above, at a temperature of 110° C. to 120° C. into a mixture of 2250 parts of potassium hydroxide and 2700 parts by volume of water.

Example 2

314 parts of 1-amino-2.5-dimethoxybenzene-4-sulfonic acid-cyclohexylamide are diazotized in the usual manner. The diazo-solution so obtained (2300 parts by volume) is run, while stirring and cooling, at about 5° C. into a solution of 1200 parts of potassium hydroxide in 5000 parts by volume of water. The slightly reddish syndiazo-solution is then stirred into a mixture kept at 100° C. of 7500 parts of potassium hydroxide and 5000 parts by volume of water.

A slightly reddish jelly-like mass separates, which is filtered with suction, when cold, through an asbestos filter, then washed with a solution of saturated potassium chloride and pressed off.

In this manner a press cake of the potassium antidiazotate from 1-amino-2.5-dimethoxybenzene-4-sulfonic acid-cyclohexylamide containing 42.8 per cent. of the pure substance, calculated on the molecular weight 314 of the amine, is obtained which corresponds to about 82 per cent. of the theoretical yield.

In the following table are indicated a number of further antidiazotates obtainable according to the present invention, as well as favorable transposition temperatures and alkali concentrations:

| Antidiazotate from— | Transposition Temperature, °C. | Alkali Concentration, Percent KOH |
|---|---|---|
| (1) 1-aminobenzene-3-sulfonic acid-diethylamide | 110–115 | 32 |
| (2) 1-amino-2-chlorobenzene-5-sulfonic acid-dimethylamide | 110 | 30 |
| (3) 1-amino-2-chlorobenzene-5-sulfonic acid-diethylamide | 115 | 36 |
| (4) 1-amino-4-chlorobenzene-5-sulfonic acid-diethylamide | 120 | 35 |
| (5) 1-amino-2-methylbenzene-5-sulfonic acid-dimethylamide | 135 | 44 |
| (6) 1-amino-2.5-dimethoxybenzene-4-sulfonic acid-n-butylamide | 120 | 41 |
| (7) 1-amino-2.5-dimethoxybenzene-4-sulfonic acid-diethylamide | 120 | 35 |
| (8) 1-amino-2.5-dimethoxybenzene-4-sulfonic acid-di-isobutylamide | 125 | 40 |
| (9) 1-amino-2.5-dimethoxybenzene-4-sulfonic acid-di-n-propylamide | 125 | 42 |
| (10) 1-amino-2.5-dimethoxybenzene-4-sulfonic acid-N-methylcyclohexylamide | 125 | 40 |
| (11) 1-amino-2.5-dimethoxybenzene-4-sulfonic acid-N-ethyl-cyclohexylamide | 125 | 40 |
| (12) 1-amino-2.5-dimethoxybenzene-4-sulfonic acid-di-n-butylamide | 125 | 38 |
| (13) 1-amino-2-methoxybenzene-5-sulfonic acid-di-n-butylamide | 125 | 40 |
| (14) 1-amino-2-methoxybenzene-4-sulfonic acid-di-n-butylamide | 125 | 40 |
| (15) 1-amino-2-ethoxybenzene-5-sulfonic acid-di-n-butylamide | 125 | 40 |
| (16) 1-amino-2-bromobenzene-5-sulfonic acid-diethylamide | 125 | 40 |
| (17) 1-amino-4-ethoxybenzene-5-sulfonic acid-n-butylamide | 130 | 40 |

We claim:
1. The antidiazotates corresponding to the following general formula:

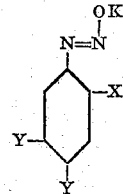

wherein X stands for a member of the group consisting of hydrogen, halogen, methyl, methoxy and ethoxy, one Y stands for a member of the group consisting of alkylaminosulfonyl, dialkylaminosulfonyl, cyclohexylaminosulfonyl and alkylcyclohexylaminosulfonyl, the alkyl groups being lower alkyls, and the other Y stands for a member of the group consisting of hydrogen, halogen, methoxy and ethoxy.

2. The antidiazotates corresponding to the following general formula

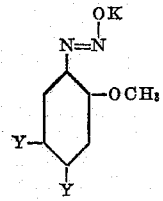

wherein one Y stands for a member of the group consisting of alkylaminosulfonyl, dialkylaminosulfonyl, cyclohexylaminosulfonyl and alkyl-cyclohexylaminosulfonyl the alkyl groups being lower alkyls and the other Y stands for a member of the group consisting of hydrogen, halogen, methoxy and ethoxy.

3. The antidiazotate corresponding to the following formula

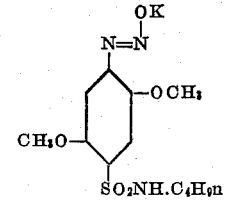

4. The antidiazotate corresponding to the following formula

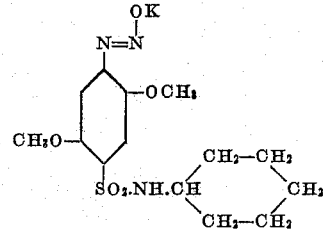

5. The antidiazotate corresponding to the following formula

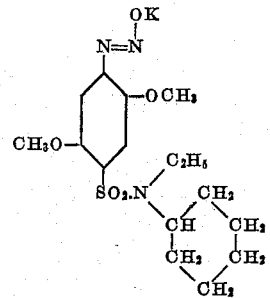

6. The antidiazotate corresponding to the following formula

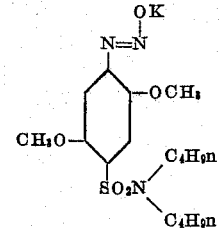

7. The antidiazotate corresponding to the following formula

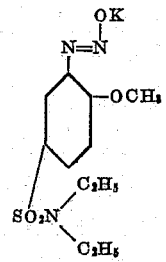

No references cited.